(12) United States Patent
Kovach et al.

(10) Patent No.: US 9,635,797 B2
(45) Date of Patent: May 2, 2017

(54) ACTUATOR ADJUSTED ROLLING BASKETS

(71) Applicant: CNH Industrial America LLC, New Holland, PA (US)

(72) Inventors: Michael G. Kovach, Morton, IL (US); Rick L. Gerber, Roanoke, IL (US)

(73) Assignee: CNH Industrial America LLC, New Holland, PA (US)

( * ) Notice: Subject to any disclaimer, the term of this patent is extended or adjusted under 35 U.S.C. 154(b) by 112 days.

(21) Appl. No.: 14/299,854

(22) Filed: Jun. 9, 2014

(65) Prior Publication Data

US 2015/0053437 A1 Feb. 26, 2015

Related U.S. Application Data

(60) Provisional application No. 61/868,114, filed on Aug. 21, 2013.

(51) Int. Cl.
*A01B 29/04* (2006.01)
*A01B 49/02* (2006.01)
*A01B 63/32* (2006.01)

(52) U.S. Cl.
CPC .......... *A01B 29/048* (2013.01); *A01B 49/027* (2013.01); *A01B 63/32* (2013.01)

(58) Field of Classification Search
CPC ..... A01B 29/04; A01B 29/045; A01B 29/046; A01B 29/048; A01B 49/027; A01B 63/002; A01B 63/008; A01B 63/10; A01B 63/24; A01B 63/32
See application file for complete search history.

(56) References Cited

U.S. PATENT DOCUMENTS

| | | | | | |
|---|---|---|---|---|---|
| 1,418,342 | A | * | 6/1922 | Walton | A01B 29/045 172/172 |
| 2,791,955 | A | * | 5/1957 | Wilson | A01B 29/045 172/532 |
| 3,220,488 | A | * | 11/1965 | Becker | A01B 29/048 172/307 |
| 4,412,588 | A | * | 11/1983 | van der Lely | A01B 29/06 172/547 |
| 4,418,761 | A | * | 12/1983 | Dietrich, Sr. | A01B 29/00 172/271 |

(Continued)

OTHER PUBLICATIONS

ECOLO-TIGER 870 Brochure, CNH America LLC, Dec. 2009 (12 pages).

*Primary Examiner* — Robert Pezzuto
*Assistant Examiner* — Jessica H Lutz
(74) *Attorney, Agent, or Firm* — Rebecca L. Henkel; Rickard K. DeMille

(57) ABSTRACT

A rolling basket assembly for use with an agricultural tillage implement having a frame. The rolling basket assembly includes a rolling basket and at least one arm assembly. The arm assembly has a first and second structural member, a biased device, a bracket and an actuator. The first structural member extends from the frame. The biased device is pivotally coupled to the first structural member or the frame. The bracket is coupled to the first structural member and to the biased device. The second structural member is pivotally coupled to the first structural member. The rolling basket is rotationally coupled to the second structural member. The actuator is pivotally coupled to both the second structural member and the bracket.

18 Claims, 5 Drawing Sheets

(56) References Cited

U.S. PATENT DOCUMENTS

| | | | |
|---|---|---|---|
| 4,473,993 A * | 10/1984 | Jennings | A01D 34/28 |
| | | | 56/192 |
| 4,554,977 A * | 11/1985 | Vachon | A01B 49/027 |
| | | | 172/177 |
| 5,234,060 A | 8/1993 | Carter | |
| 5,632,343 A * | 5/1997 | Gengler | A01B 27/00 |
| | | | 172/146 |
| 5,833,011 A | 11/1998 | Boertlein | |
| 6,068,061 A | 5/2000 | Smith et al. | |
| 6,554,078 B1 | 4/2003 | McDonald | |
| 6,655,118 B1 * | 12/2003 | Thompson | A01D 43/107 |
| | | | 56/15.8 |
| 6,681,868 B2 | 1/2004 | Kovach et al. | |
| 6,761,120 B2 | 7/2004 | Kovach et al. | |
| 6,763,896 B1 | 7/2004 | Hurtis | |
| 6,843,047 B2 | 1/2005 | Hurtis | |
| 6,871,709 B2 | 3/2005 | Knobloch et al. | |
| 7,065,945 B2 | 6/2006 | Hurtis | |
| 7,513,316 B2 | 4/2009 | Ruckle et al. | |
| 7,766,093 B2 | 8/2010 | Becker et al. | |
| 7,806,197 B2 | 10/2010 | Steinlage et al. | |
| 8,006,775 B2 | 8/2011 | Steinlage et al. | |
| 8,302,700 B2 | 11/2012 | Kovach et al. | |
| 2008/0066935 A1 * | 3/2008 | Becker | A01B 63/32 |
| | | | 172/13 |
| 2012/0227991 A1 * | 9/2012 | Hake | A01B 39/08 |
| | | | 172/1 |
| 2014/0054051 A1 * | 2/2014 | Landoll | A01B 63/008 |
| | | | 172/170 |
| 2014/0262370 A1 * | 9/2014 | Kohn | A01B 49/027 |
| | | | 172/140 |
| 2014/0318098 A1 * | 10/2014 | Fay, II | A01D 34/001 |
| | | | 56/229 |

* cited by examiner tillage implement 14 is configured as a multi-section field disk ripper 14, and includes a main frame section 16. Main frame section 16 is the section that is directly towed by a traction unit, such as agricultural tractor 12. Main frame

ACTUATOR ADJUSTED ROLLING BASKETS

This is a non-provisional application based upon U.S. provisional patent application Ser. No. 61/868,114, entitled "ACTUATOR ADJUSTED ROLLING BASKETS", filed Aug. 21, 2013, which is incorporated herein by reference.

BACKGROUND OF THE INVENTION

1. Field of the Invention

The present invention relates to agricultural implements, and, more particularly, to agricultural field tillage implements.

2. Description of the Related Art

Farmers utilize a wide variety of tillage implements to prepare soil for planting. Some such implements include two or more sections coupled together to perform multiple functions as they are pulled through fields by a tractor. For example, a cultivator/harrow, which is capable of simultaneously tilling soil and leveling the tilled soil in preparation for planting. This implement includes a cultivator that is towed by a tractor, and a harrow that is towed by the cultivator. Farmers for years have been searching for an implement that would allow them to convert compacted soil into a level seedbed with a consistent depth for providing excellent conditions for planting of a crop. Another desirable result is that the grass or residual crop material disposed on top of the soil be worked into the seedbed so that it does not interfere with a planting implement subsequently passing through the seedbed. As a standalone implement or coupled with some other implement a farmer might use an implement with a reel having a plurality of blades for breaking clods into smaller sizes and chopping up the debris still remaining on the top of the soil, known as a crumbler basket.

The crumbler basket arrangement can be used to roll behind the rows of tines of a harrow, to flatten the ridges left by the tines and move the residual crop material into the soil to enhance contact with the soil. The crumbler basket is used to provide a firm, level field with coarse soil on top that resists crusting, with the finer soil particles at planting depth for optimum seed-to-soil contact.

The control of the positioning of the crumbler baskets include fixed position settings carried out with pins, bolts or mechanical crank adjustments, which requires the operator to manually adjust the framework coupled to the crumbler baskets to adjust the downward pressure on the crumbler baskets to thereby control the depth of the blades.

What is needed in the art is an easy to use mechanism for the positioning of rolling baskets of an agricultural tillage implement.

SUMMARY OF THE INVENTION

The present invention provides a device to position and adjust the position of rolling baskets.

The invention in one form is directed to an agricultural tillage implement including a main frame section, a tool bar, a secondary frame and at least one rolling basket assembly coupled to the secondary frame. The main frame section has a pull hitch extending in a travel direction. The tool bar is coupled with and extends transverse to the pull hitch. The secondary frame is coupled with the main frame and/or the tool bar. The rolling basket assembly includes a rolling basket and at least one arm assembly. The arm assembly has a first and second structural member, a biased device, a bracket and an actuator. The first structural member extends from the secondary frame. The biased device is pivotally coupled to the first structural member. The bracket is coupled to the first structural member and to the biased device. The second structural member is pivotally coupled to the first structural member. The rolling basket is rotationally coupled to the second structural member. The actuator is pivotally coupled to both the second structural member and the bracket.

The invention in another form is directed to a rolling basket assembly for use with an agricultural tillage implement having a frame. The rolling basket assembly includes a rolling basket and at least one arm assembly. The arm assembly has a first and second structural member, a biased device, a bracket and an actuator. The first structural member extends from the frame. The biased device is pivotally coupled to the first structural member or the frame. The bracket is coupled to the first structural member and to the biased device. The second structural member is pivotally coupled to the first structural member. The rolling basket is rotationally coupled to the second structural member. The actuator is pivotally coupled to both the second structural member and the bracket.

An advantage of the present invention is that the rolling baskets can be adjusted from the cab of the tractor.

Another advantage is that the rolling baskets can be pinned in a biased down position.

Yet another advantage is that the rolling baskets can be pinned in an up position.

Still yet another advantage is that the rolling baskets can float when they are not constrained by a pin.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
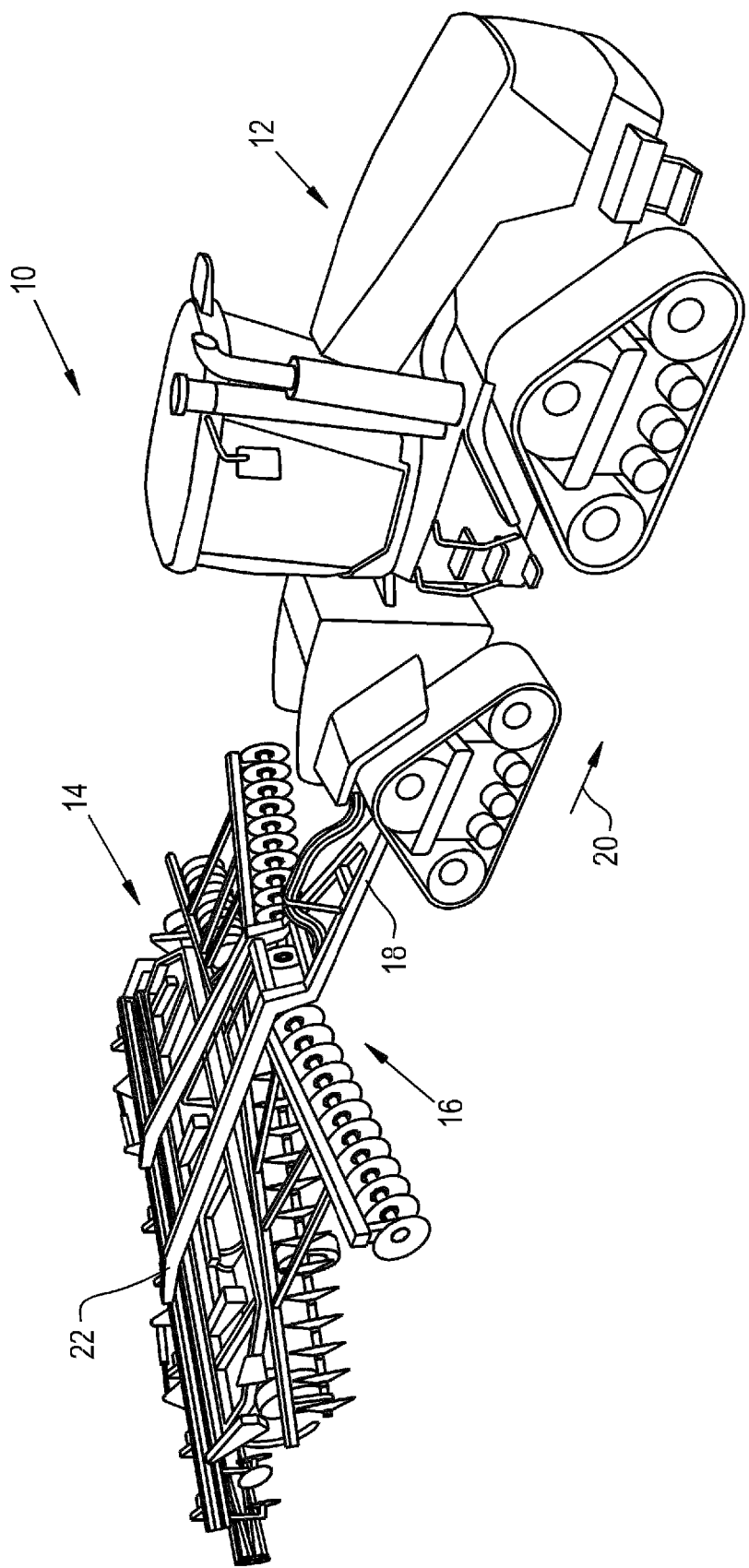
FIG. 1 illustrates a tillage implement having an embodiment of rolling basket assemblies of the present invention being pulled by a tractor.

Referring now to the drawings, and more particularly to FIG. 1, there is shown a tillage apparatus 10 which generally includes a tractor 12 and an agricultural tillage implement 14 for tilling and finishing soil prior to seeding.

Figure 2:
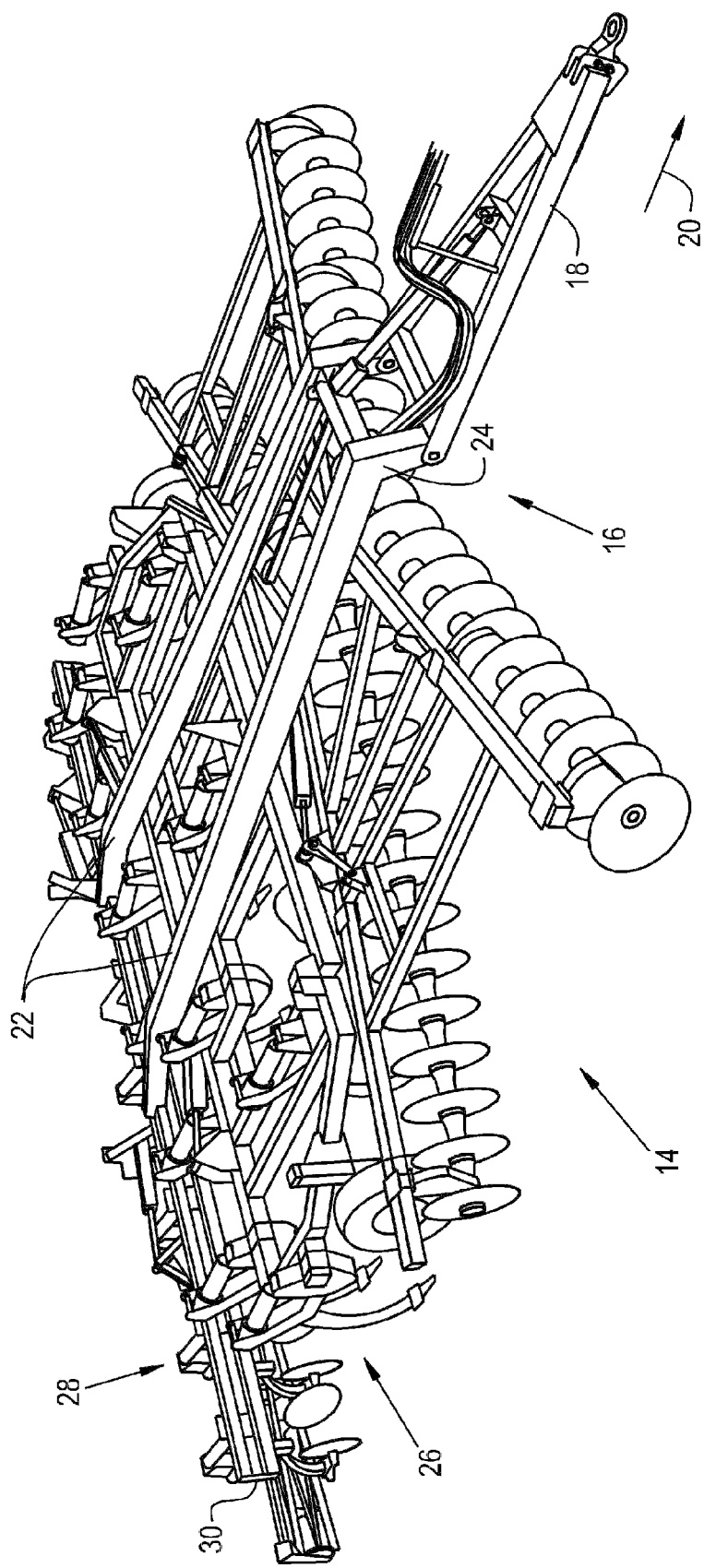
FIG. 2 is a perspective view of the tillage implement of FIG. 1.
Figure 3:
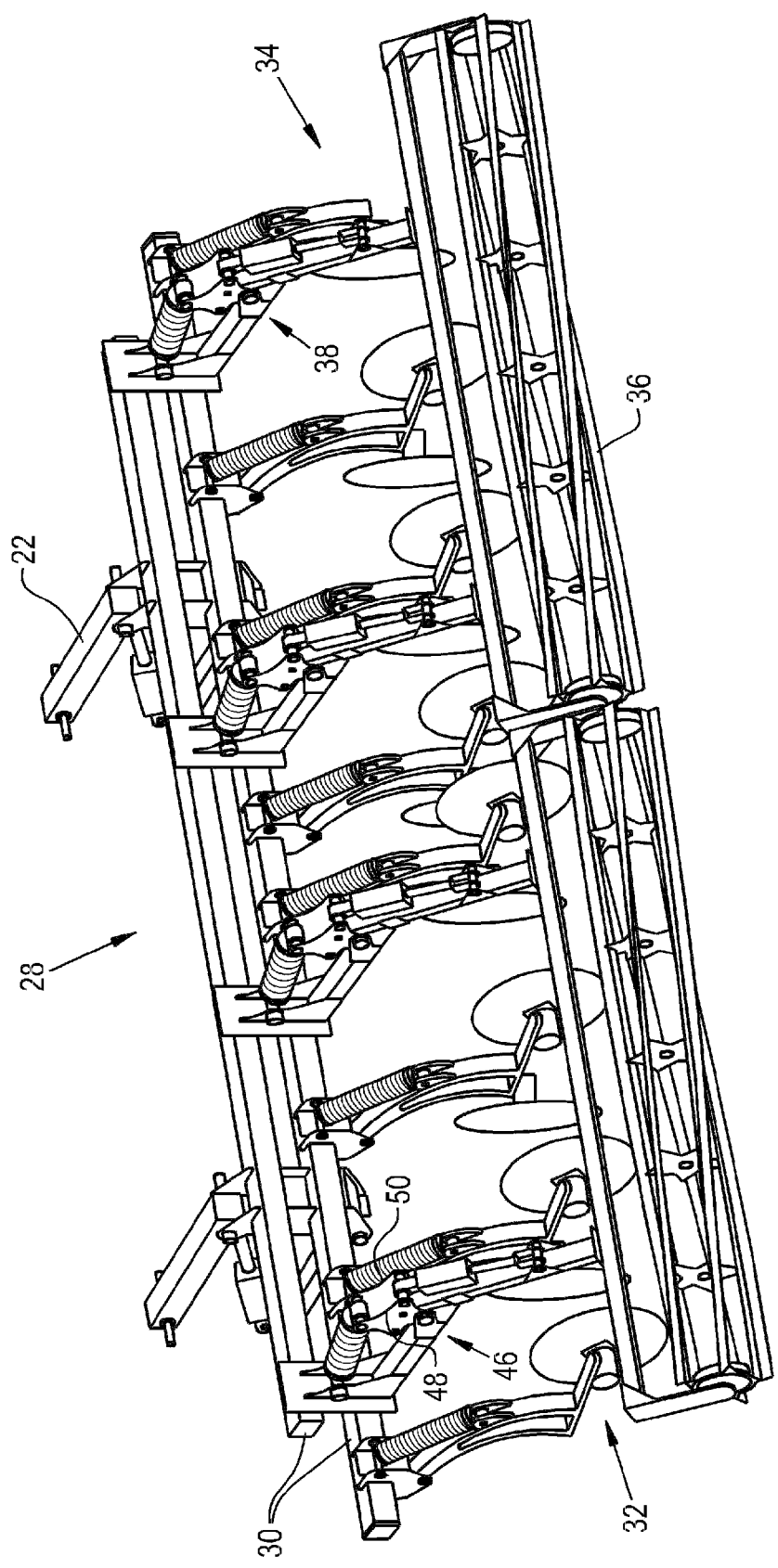
FIG. 3 is a partial rear view of the tillage implement of FIGS. 1 and 2.

Now, additionally referring to FIGS. 2 and 3, agricultural tillage implement 14 is configured as a multi-section field disk ripper 14, and includes a main frame section 16. Main frame section 16 is the section that is directly towed by a traction unit, such as agricultural tractor 12. Main frame section 16 includes a pull hitch 18 generally extending in a travel direction 20, and a frame member 22 which is coupled with and extends from pull hitch 18. Reinforcing gusset plates 24 may be used to strengthen the connection between pull hitch 18 and frame member 22. Main frame section 16 generally functions to carry a shank frame 26 for tilling the soil, and a rear implement 28 for finishing the soil. Rear implement 28 includes a secondary frame 30, leveling blades 32 and rolling (aka, crumbler) basket assemblies 34, which coact with each other to finish the soil in preparation for planting. Leveling blades 32 and rolling basket assemblies are both attached to secondary frame 30.

Figure 4:
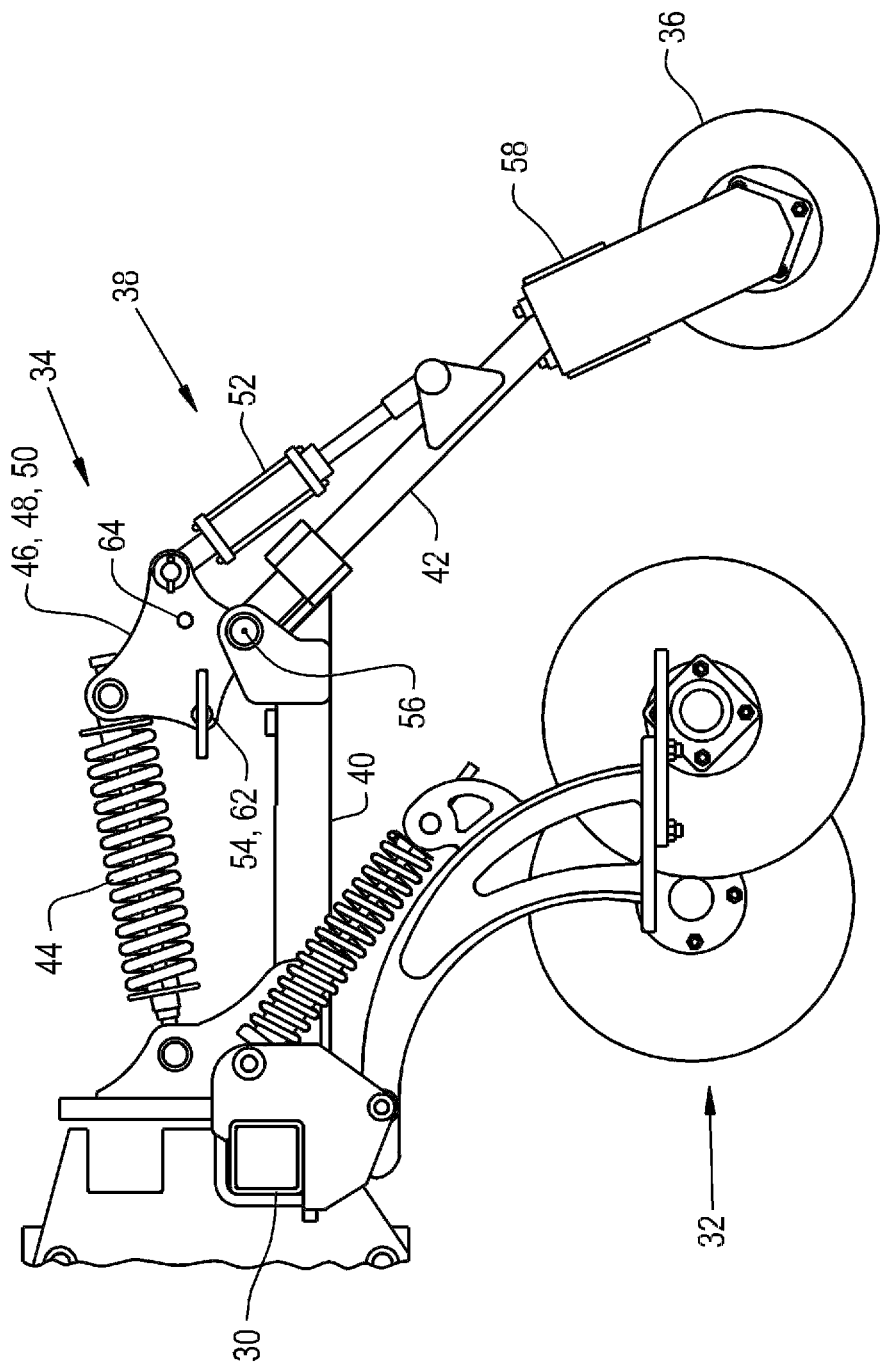
FIG. 4 is a side view of a rolling basket assembly of FIGS. 1-3, with the basket arm in a down position.
Figure 5:
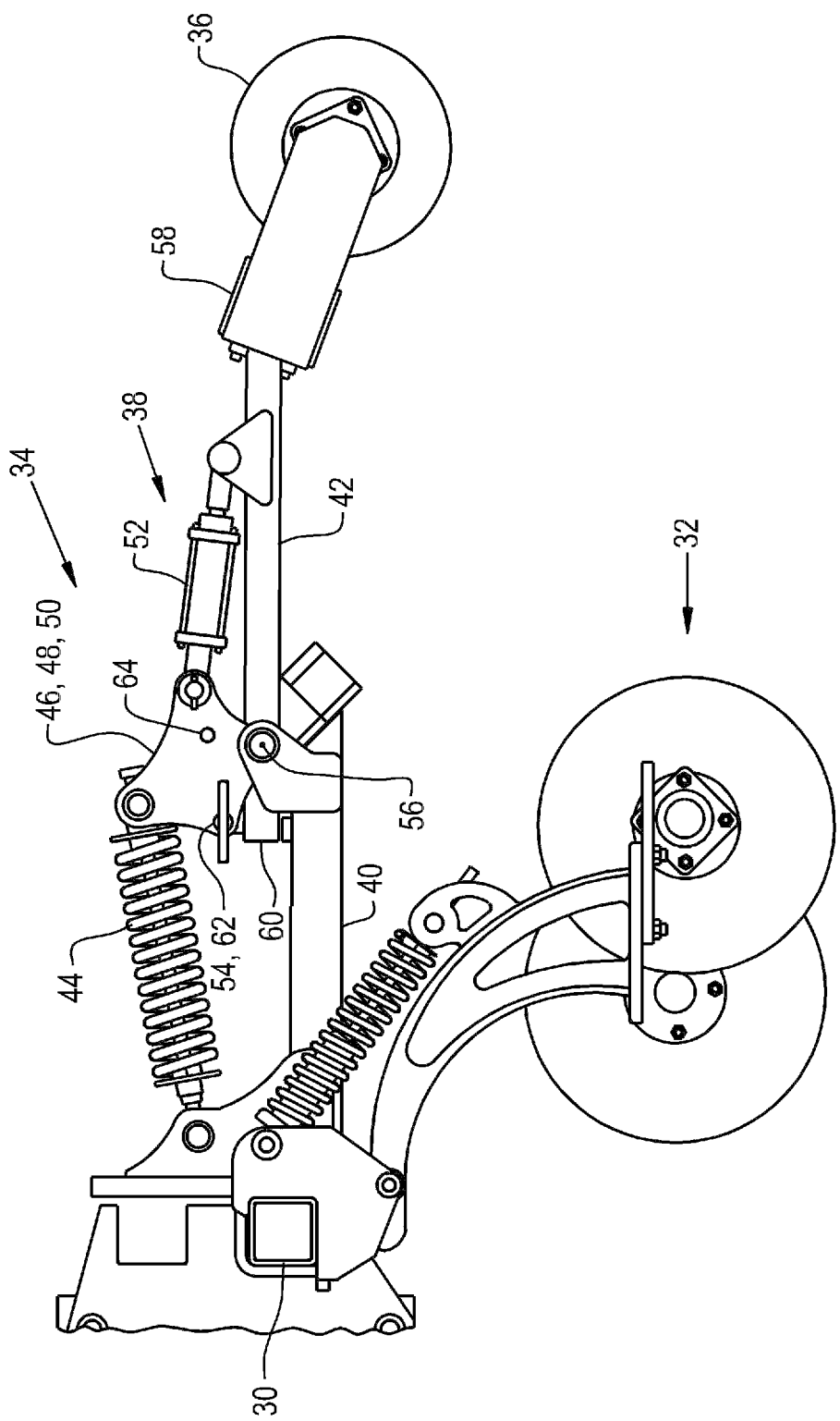
FIG. 5 is another side view of the rolling basket assembly of FIG. 4, with the basket arm in an up position.

Now, additionally referring to FIGS. 4 and 5, there are shown further details of rolling basket assemblies 34 which each include a rolling basket 36 with two arm assemblies 38 coupling the rolling basket assemblies 34 to secondary frame 30. Arm assemblies 38 each include structural members 40 and 42, a spring 44 also know as a biased member 44, a bracket 46 having plates 48 and 50, an actuator 52 and a pin 54. Structural member 40 is connected to secondary frame 30 in a rigid manner. Part of structural member 40 has a parallel gusseted area for biased member 44 to be pivotally coupled thereto. Bracket 46 is also pivotally coupled to structural member 40 at an end substantially opposite from where biased member 44 is coupled to structural member 40. Biased member 44 is also pivotally coupled to bracket 46 at a location that is offset from where bracket 46 is pivotally coupled to structural member 40. Actuator 52, which is depicted as a hydraulic cylinder 52, is pivotally connected to both bracket 46 and structural member 42.

Structural member 42 is pivotally coupled with structural member 40, and although other points of connection are contemplated, it is shown in FIGS. 4 and 5 as being pivotally coupled coaxially with bracket 46. A distal end of structural member 42 is connected to a framework 58 that is coupled rotationally with rolling basket 36, which means structural member 42 is rotationally coupled with rolling basket 36. An end 60 of structural member 42 opposite the connection to framework 58 extends beyond the place that it is pivotally coupled to structural member 40. End 60 moves between plates 48 and 50 as structural member 42 pivots about axis 56.

Plates 48 and 50 have holes 62 and 64 therethrough to accommodate pin 54, which is selectively placed in one set of holes or the other depending upon the operator's selected mode of operation for rolling basket assemblies 34. When pin 54 is in holes 64 rolling basket assembly 34 is in a float mode, with pin 54 not substantially constraining the movement of structural member 42. The downward pressure that rolling basket 36 exerts upon the ground in the float mode can be just the unbiased force that results from the weight of the assembly that is pivoting about axis 56, when actuator 52 by way of a valve (not shown) has no fluid pressure applied and the fluid is free to enter and leave both sides of actuator 52. However, actuator 52 may be activated to alter the force rolling basket 36 exerts upon the ground. Actuator 52 can extend to place structural member 42 in the position as shown in FIG. 4, and actuator 52 can retract to the position shown in FIG. 5.

When actuator 52 is either retracted (FIG. 5) or extended (FIG. 4) pin 54 can be inserted in holes 62 to hold structural member 42 respectively in an up mode and a down mode. Pin 54 is used to hold end 60 on one side of holes 62 or the other side of holes 62 to thereby keep rolling basket assembly 34 in the up mode or the down mode.

When rolling basket assembly 34 is in the float mode the downward force on rolling basket 36 is determined by the serial combination of the position of actuator 52 and the bias of biased member 44 to thereby allow a variable downward force dependent upon the position selected by the operator of actuator 52. Of course if actuator 52 is inactive (with the valve in a float mode) then biased member 44 likewise exerts no downward force on rolling basket 36.

When rolling basket assembly 34 is in the down mode, as shown in FIG. 4, pin 54 constrains the position of end 60 so that the bias force from biased member 44 is transferred to rolling basket 36 as determined by the geometry of the configuration.

When rolling basket assembly 34 is in the up mode, as shown in FIG. 5, pin 54 holds end 60 so that roller basket 36 is held in the air for the purpose of transport or to keep roller basket 36 from contacting the soil as selected by the operator. Advantageously actuator 52 allows for the easy insertion and removal of pin 54 when the operator selects, by way of a valve, the retraction or extension of actuator 52 as appropriate. Pin 54 advantageously allows for the locking of rolling basket assembly 34 in selected positions by using holes 62, or to keep the movement unrestrained by using holes 64.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
   a main frame section including a pull hitch extending in a travel direction, and a tool bar coupled with and extending transverse to said pull hitch;
   a secondary frame coupled with at least one of said main frame and said tool bar; and
   at least one rolling basket assembly coupled to said secondary frame, said rolling basket assembly including:
      at least one rolling basket; and
      at least one arm assembly having:
         a first structural member extending from said secondary frame;
         a biased device pivotally coupled to said first structural member;
         a bracket pivotally coupled to said first structural member and to said biased device;
         a second structural member pivotally coupled to said first structural member, said at least one rolling basket being rotationally coupled to said second structural member; and
         an actuator pivotally coupled to said second structural member, said actuator also being pivotally coupled to said bracket, said second structural member and said bracket each being pivotally coupled to said first structural member about a generally horizontal common axis.

2. The agricultural tillage implement of claim 1, wherein said bracket has two substantially parallel plates with said biased device, said first structural member, said second structural member and said actuator all being pivotally coupled to both of said plates.

3. The agricultural tillage implement of claim 2, wherein said at least one arm assembly further includes a pin removeably associated with said bracket, said plates having holes therein for the reception of said pin including a first set of holes.

4. The agricultural tillage implement of claim 3, wherein said first set of holes are configured to allow said second structural member to pivot to position said rolling basket in one of an up position and a down position with said pin removed from said first set of holes, said pin retaining said second structural member on a selected side of said first set of holes when said pin is positioned in said first set of holes.

5. The agricultural tillage implement of claim 4, wherein said plates have a second set of holes for said pin, said second set of holes positioning said pin so said second structural member may pivot thereby allowing said rolling basket to be in a floating mode.

6. The agricultural tillage implement of claim 5, wherein said rolling basket assembly is configured to position said second structural member below said first set of holes when said pin is removed from said first set of holes and when said actuator is retracted, said pin being insertable into said first set of holes after said actuator is retracted.

7. The agricultural tillage implement of claim 6, wherein said at least one arm assembly includes a first arm assembly and a second arm assembly, said rolling basket being coupled to both said first arm assembly and said second arm assembly.

8. The agricultural tillage implement of claim 1, wherein said biased device and said actuator are in a mechanical series positioning arrangement with said rolling basket.

9. The agricultural tillage implement of claim 8, wherein said bracket is configured to be pinned to hold said second structural member in a relatively fixed position to thereby hold said roller basket in a ground engaging position.

10. A rolling basket assembly for use with an agricultural tillage implement having a frame, the rolling basket assembly comprising:
    a rolling basket; and
    at least one arm assembly having:
        a first structural member extending from said frame;
        a biased device pivotally coupled to one of said first structural member and said frame;
        a bracket pivotally coupled to said first structural member and to said biased device;
        a second structural member pivotally coupled to said first structural member, said at least one rolling basket being rotationally coupled to said second structural member; and
        an actuator pivotally coupled to said second structural member, said actuator also being pivotally coupled to said bracket, said second structural member and said bracket each being pivotally coupled to said first structural member about a generally horizontal common axis.

11. The rolling basket assembly of claim 10, wherein said bracket has two substantially parallel plates with said biased device, said first structural member, said second structural member and said actuator all being pivotally coupled to both of said plates.

12. The rolling basket assembly of claim 11, wherein said at least one arm assembly further includes a pin removeably associated with said bracket, said plates having holes therein for the reception of said pin including a first set of holes.

13. The rolling basket assembly of claim 12, wherein said first set of holes are configured to allow said second structural member to pivot to position said rolling basket in one of an up position and a down position with said pin removed from said first set of holes, said pin retaining said second structural member on a selected side of said first set of holes when said pin is positioned in said first set of holes.

14. The rolling basket assembly of claim 13, wherein said plates have a second set of holes for said pin, said second set of holes positioning said pin so said second structural member may pivot thereby allowing said rolling basket to be in a floating mode.

15. The rolling basket assembly of claim 14, wherein said rolling basket assembly is configured to position said second structural member below said first set of holes when said pin is removed from said first set of holes and when said actuator is retracted, said pin being insertable into said first set of holes after said actuator is retracted.

16. The rolling basket assembly of claim 15, wherein said at least one arm assembly includes a first arm assembly and a second arm assembly, said rolling basket being coupled to both said first arm assembly and said second arm assembly.

17. The rolling basket assembly of claim 10, wherein said biased device and said actuator are in a mechanical series positioning arrangement with said rolling basket.

18. The rolling basket assembly of claim 17, wherein said bracket is configured to be pinned to hold said second structural member in a relatively fixed position to thereby hold said roller basket in a ground engaging position.

* * * * *